United States Patent
Saprykin et al.

(10) Patent No.: US 10,404,814 B1
(45) Date of Patent: Sep. 3, 2019

(54) SYSTEMS AND METHODS FOR ARRANGING AND STORING CONTENT SELECTION PARAMETERS BASED ON SELECTION POLICIES

(71) Applicant: Google Inc.

(72) Inventors: Igor Saprykin, Mountain View, CA (US); Nicholas Tan, Mountain View, CA (US); Pranav Kantawala, Mountain View, CA (US); Ying Wang, Mountain View, CA (US); Piyush Prahladka, Mountain View, CA (US); Cedric Dupont, Mountain View, CA (US); Ankur Lahoti, Mountain View, CA (US); Nandita Prabhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 333 days.

(21) Appl. No.: 15/366,360

(22) Filed: Dec. 1, 2016

(51) Int. Cl.
*H04L 29/08* (2006.01)
*H04L 29/06* (2006.01)
*G06F 16/951* (2019.01)
*G06F 16/22* (2019.01)
*G06Q 30/02* (2012.01)

(52) U.S. Cl.
CPC .......... *H04L 67/20* (2013.01); *G06F 16/2282* (2019.01); *G06F 16/951* (2019.01); *G06Q 30/02* (2013.01); *H04L 67/18* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 7,903,099 B2* | 3/2011 | Baluja | ............. | G06Q 30/02 345/1.1 |
| 8,099,109 B2* | 1/2012 | Altman | ............. | G06Q 30/0207 455/456.3 |

(Continued)

OTHER PUBLICATIONS

Geyik, S.C., et al., "Multi-Touch Attribution Based Budget Allocation in Online Advertising," https://arxiv.org/pdf/1502.06657.pdf (Feb. 24, 2015).

*Primary Examiner* — Thomas J Dailey
(74) *Attorney, Agent, or Firm* — Foley & Lardner LLP (57) ABSTRACT

Systems and methods for providing third-party content can include a data processing system receiving a first content selection parameter and a plurality of second content selection parameters to manage serving of content items of a third-party content provider. The data processing system can store the first content selection parameter and a plurality of second content selection parameters in a memory bank. Upon receiving a request for third-party content, the data processing system can retrieve the first content selection parameter and the plurality of second content selection parameters from the memory bank, and determine a parameter among the first content selection parameter and the plurality of second content selection parameters. The data processing system can select a content item from a plurality of content items of the third-party content provider based on the determined parameter, and provide the selected content item for presentation on a client device.

13 Claims, 5 Drawing Sheets

(56) References Cited

U.S. PATENT DOCUMENTS

| | | | |
|---|---|---|---|
| 8,229,458 B2* | 7/2012 | Busch | H04W 4/029 |
| | | | 455/456.1 |
| 9,864,998 B2* | 1/2018 | Yruski | G06Q 30/02 |
| 2007/0028263 A1* | 2/2007 | Collins | G06F 17/2785 |
| | | | 725/34 |
| 2007/0168255 A1* | 7/2007 | Zinn | G06Q 30/02 |
| | | | 705/14.52 |
| 2008/0255944 A1* | 10/2008 | Shah | G06Q 30/02 |
| | | | 705/14.47 |
| 2011/0238486 A1* | 9/2011 | Liu | G06Q 30/02 |
| | | | 705/14.42 |
| 2012/0158485 A1 | 6/2012 | Ogawa | |
| 2014/0172573 A1 | 6/2014 | Saurabh | |
| 2014/0188616 A1* | 7/2014 | Badenhop | G06Q 30/0267 |
| | | | 705/14.58 |
| 2014/0278912 A1* | 9/2014 | Hughes | G06Q 30/0242 |
| | | | 705/14.41 |
| 2015/0113096 A1* | 4/2015 | Svendsen | G06Q 30/02 |
| | | | 709/217 |
| 2015/0227963 A1 | 8/2015 | Geyik et al. | |

* cited by examiner

SYSTEMS AND METHODS FOR ARRANGING AND STORING CONTENT SELECTION PARAMETERS BASED ON SELECTION POLICIES

BACKGROUND

For content delivery systems, the arrangement and storage of parameters used to distribute third-party content can impact the amount of memory resources and computational resources used by such systems. Furthermore, the arrangement and storage of these parameters can influence the speed of processing requests for third-party content. Selecting and distributing third-party content items, responsive to requests for third-party content, in real time calls for efficient arrangement and storage of parameters provided by third-party content providers to manage distribution of their content to client devices.

SUMMARY

According to at least one aspect, a system to arrange and store content selection parameters in a memory bank, to distribute third-party content to computing devices via a computer network, based on content selection policies can include a data processing system having one or more processors, a settings component and a content component. The settings component can receive, from a computing device associated with a third-party content provider, a first content selection parameter of the third-party content provider. The settings component can provide the first content selection parameter for storage in a memory bank. The settings component can receive, from the computing device, a plurality of second content selection parameters of the third-party content provider. Each of the plurality of second content selection parameters can be associated with a content selection policy different than a content selection policy associated with the first content selection parameter. The settings component can provide the plurality of second content selection parameters for storage in the memory bank together with the first content selection parameter. The content component can receive, via a computer network, a request for third-party content for presentation on a client device. The content component can retrieve the first content selection parameter and the plurality of second content selection parameters from the memory bank, responsive to the request. The content component can determine a parameter among the first content selection parameter and the plurality of second content selection parameters. The content component can select, based on the parameter, a content item from a plurality of content items of the third-party content provider, and provide, via the computer network the selected content item for presentation on the client device.

According to at least another aspect, a method of arranging and storing content selection parameters in a memory bank, to distribute third-party content to computing devices via a computer network, based on content selection policies can include a data processing system receiving, from a computing device associated with a third-party content provider, a first content selection parameter of the third-party content provider. The data processing system can provide the first content selection parameter for storage in a memory bank. The data processing system can receive, from the computing device, a plurality of second content selection parameters of the third-party content provider. Each of the plurality of second content selection parameters can be associated with content selection policy different than a content selection policy of the first content selection parameter. The data processing system can provide the plurality of second content selection parameter for storage in the memory bank together with the first content selection parameter. The data processing system can receive, via a computer network, a request for third-party content for presentation on a client device. The data processing system can retrieve the first content selection parameter and the plurality of second content selection parameters from the memory bank, responsive to the request. The data processing system can determine a parameter among the first content selection parameter and the plurality of second content selection parameter. The data processing system can select, based on the parameter, a content item from a plurality of content items of the third-party content provider, and provide via the computer network the selected content item for presentation on the client device.

According to at least another aspect, a non-transitory computer-readable medium comprising computer code instructions stored thereon, which when executed by one or more processors, cause a data processing system to perform a method of arranging and storing content selection parameters in a memory bank, to distribute third-party content to computing devices via a computer network, based on content selection policies. The method can include receiving, from a computing device associated with a third-party content provider, a first attribute value associated with a first attribute to select content items of the third-party content provider. The method can include providing the first content selection parameter for storage in a memory bank. The method can include receiving from the computing device, a plurality of second content selection parameters of the third-party content provider. Each of the plurality of second content selection parameters can be associated with a content selection policy different than a content selection policy of the first content selection parameter. The method can providing the plurality of second content selection parameters for storage in the memory bank together with the first content selection parameter. The method can include receiving via a computer network, a request for third-party content for presentation on a client device, and retrieving the first content selection parameter and the plurality of second content selection parameters from the memory bank, responsive to the request. The method can include determining a parameter among the first content selection parameter and the plurality of second content selection parameters. The method can include selecting based on the parameter, a content item from a plurality of content items of the third-party content provider, and providing via the computer network the selected content item for presentation on the client device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Following below are more detailed descriptions of various concepts related to, and implementations of, methods, apparatuses, and systems for improving the speed of distribution of the third-party content to client devices by efficiently arranging and storing content selection parameters associated with a common parameter category. Methods, apparatuses, and systems for managing distribution of third-party content associated with various third-party content providers can include managing respective sets of content selection parameters to reduce usage of memory and computing resources, and that accelerates the processing of requests for third-party content. For example, a data processing system can store independent content selection parameters sharing a common parameter category under a single set of parameters. Storing such parameters under multiple sets of parameters involves storage redundancies of at least some of the content selection parameters and, therefore, can increase memory usage compared to using a set of parameters. The data processing system can store independent content selection parameters associated with a common parameter category, for a given third-party content provider, together in a single memory bank to accelerate retrieval of these parameters when processing third-party content requests. The data processing system can arrange independent content selection parameters of a common parameter category, for a given third-party content provider, in a single data structure. The use of a single data structure to speed up retrieval and processing of such content selection parameters, for example, when handling requests for third-party content.

Third-party content providers provide third-party content for display with information resources (e.g., websites, gaming platforms, or maps) on client devices based on a plurality of content selection parameters. A third-party content provider can assign a set of content selection parameters (e.g., forming an ad campaign) used to select third-party content items of that third-party content provider for presentation on client devices. The data processing system can store the set of content selection parameters, for example, in relation with an account of the third-party content provider. Responsive to a request for third-party content for display on a client device, the data processing system can retrieve the set of content selection parameters and determine, based on the retrieved set of content selection parameters, whether or not to provide a content item of the third-party content provider for presentation on the client device.

For some categories of content selection parameters, the data processing system allocates a single content selection parameter per category to each set of content selection parameters associated with a given third-party content provider. For example, each set of content selection parameters associated with a respective third-party content provider can include a single budget value (e.g., an allocation value) set by that third-party content provider. Also, the third-party content provider can define a single theme for each set of attributes (or each ad campaign). A theme can be associated with a respective database of content items. For the categories of content selection parameters, assigning multiple content selection parameters from that category can lead to multiple sets of attributes (or multiple ad campaigns). For instance, when using multiple independent allocation values (e.g., not portions of one another), a third-party content provider can set multiple sets of content selection parameters (or multiple ad campaigns), each associated with one of the multiple allocation values. Also, a third-party content provider can set multiple sets of content selection parameters (or multiple ad campaigns), each associated with a respective theme or a respective database of content items. However, setting multiple sets of content selection parameters can result in unnecessary redundancy and increased bandwidth, latency, memory and processing load requirements to accommodate multiple independent content selection parameters within a given parameter category.

The redundancy in setting multiple sets of content selection parameters (e.g., multiple ad campaigns) results in inefficient use of memory storage. With a large number of third-party content providers (e.g., thousands or hundreds of thousands), maintaining multiple sets of content selection parameters (or multiple ad campaigns) per third-party content provider increases the amount of memory used by the data processing system to store data of the third-party content providers. Furthermore, processing a request for third-party content involves the data processing system retrieving and storing copies of the multiple sets of content selection parameters, instead of a copy of a single set of content selection parameters, associated with a given third-party content provider in a cache memory or a random access memory (RAM). The redundancy associated with maintaining multiple sets of content selection parameters instead of a single set of content selection parameters per third-party content provider can cause the data processing system to consume more processing power and can increase the time needed for the data processing system to retrieve data associated with a third-party content provider. Also, the redundancy causes inefficient use of cache memory or RAM in storing retrieved copies of the sets of content selection parameters. In addition, processing the request for third-party content involves the data processing system comparing the multiple sets of content selection parameters, instead of a single set of content selection parameters, of the third-party content provider with parameters of the request for third-party content. The comparison is performed to determine whether to provide a content item of the third-party content provider for presentation on a client device. Also, comparing multiple sets of content selection parameters instead of a single set of content selection parameters increases the time needed for the data processing system to process the request for third-party content.

According to aspects of the present disclosure, systems and methods for providing third-party content can include a data processing system receiving, from a computing device associated with a third-party content provider, a first content selection parameter and a plurality of second content selection parameters for selecting content items of the third-party content provider for presentation on client devices. The plurality of second content selection parameters can be independent of the first content selection parameter in the sense that they can be alternatives to one another when selecting third-party content for presenting to a given set of client devices. Each of the plurality of second content selection parameters does not represent a portion of the first content selection parameter and the first content selection parameter does not represent a sum of the plurality of second content selection parameters. For example, the first content selection parameters can be, for example, a first allocation value associated with a nationwide geographical area, whereas the plurality of second content selection parameters can be a plurality of second allocation values, each associated with a respective local geographical area, such that the second allocation values are not sub-allocation values of the first allocation value. The local geographical areas can be overlapping with the nationwide geographical area. While associated with the same parameter category, the first content selection parameter and the plurality of second content selection parameters can be associated with separate content targeting criteria e.g., content selection policies). For instance, the plurality of second content selection parameters can be used to enforce or define content selection policies (or content selection goals) based on local geographical areas or based on types of client devices, whereas the first content selection parameter can be used to define or enforce a broad content selection policy, e.g., that is constrained by any local geographical area or any client device type.

The data processing system can store the first content selection parameter and the plurality of second content selection parameters together in a single memory bank. Storing the first content selection parameters and the plurality of second content selection parameters in a single memory bank allows for fast retrieval of such values. The data processing system can receive, via a computer network, a request for third-party content for presentation on a client device. Responsive to the request, the data processing system can retrieve the first content selection parameter and the plurality of second content selection parameters from the memory bank, and determine a parameter among the first content selection parameter and the plurality of second content selection parameters for use in selecting a content item. The data processing system can select a content item from a plurality of content items of the third-party content provider based on the determined parameter, and provide the selected content item for presentation on the client device.

The data processing system can update the first content selection parameters or one of the second content selection parameters responsive to providing the content item for presentation on the client device. For example, if the content item is selected based on the first content selection parameter, the data processing system can update the first content selection parameter or an attribute thereof (e.g., by decrementing the parameter value or incrementing a respective counter). If the content item is selected based one of the plurality of second content selection parameters, the data processing system can update that second content selection parameters or an attribute thereof (e.g., by decrementing the parameter value or incrementing a respective counter). The data processing system can also provide indications of content items selected and provided for display on client devices based on the first content selection parameter or indications of content items selected and provided for display on client devices based on one of the plurality of second content selection parameters to the computing device associated with third-party content provider.

By storing and maintaining independent content selection parameters of the same category in a single set of content selection parameters, the systems and methods described herein avoid storing multiple copies of other parameters. Specifically, by maintaining a single set of content selection parameters (or reducing the number of sets of content selection parameters) per third-party content provider, a data processing system can reduce the amount of memory used to store such parameters substantially, especially when the number of third-party content providers is large (e.g., in the thousands or hundreds of thousands).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
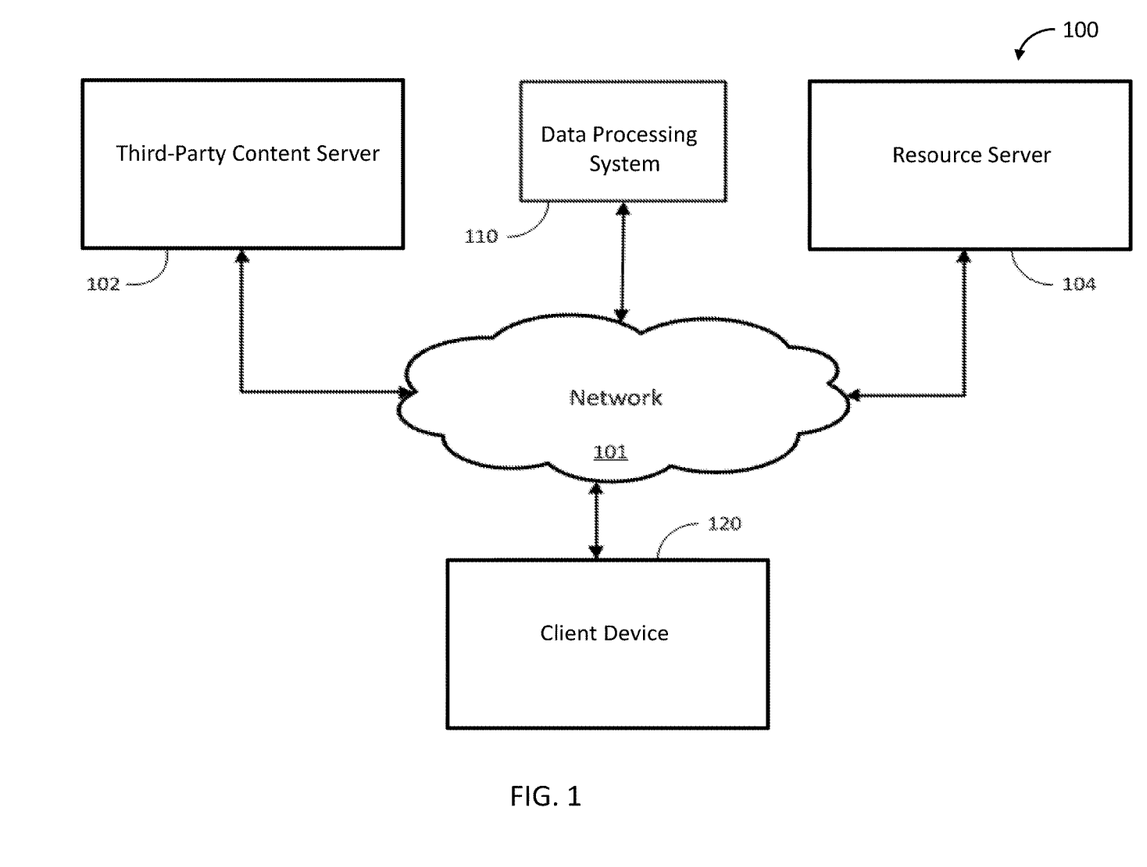
FIG. 1 is depicts an implementation of a system of providing content via a computer network.

FIG. 1 is a block diagram of an implementation of a system 100 for providing content via at least one computer network such as the network 101. The network 101 may include a local area network (LAN), wide area network (WAN), a telephone network, such as the Public Switched Telephone Network (PSTN), a wireless link, an intranet, the Internet, or combinations thereof. The system 100 can also include at least one data processing system 110, such as a content delivery system. The data processing system 110 can arrange and store content selection parameters, used to select and provide third-party content associated with various third-party content providers to client devices 120, according to separate content selection policies. The data processing system 110 can enhance the speed of processing requests for third-party content by efficiently grouping and storing content selection parameters received from each third-party content provider. For instance, for a given third-party content provider, the data processing system 110 can arrange and store content selection parameters associated with various selection policies within a single set of content selection parameters to reduce memory usage. The data processing system 110 can speed up the retrieval of such content selection parameters and enhance the speed of processing requests for third-party content by storing content selection parameters of the same category, but associated with separate selection policies, together in a single memory bank.

The data processing system 110 can include at least one logic device, such as a computing device having a data processor, to communicate via the network 101, for example with a resource server 104, a client device 120, or a third-party content server 102. The data processing system 110 can include one or more data processors, such as a content placement processor, configured to execute instructions stored in a memory device to perform one or more operations described herein. In other words, the one or more data processors and the memory device of the data processing system 110 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language. The processor may process instructions and output data to effect presentation of one or more content items to the resource server 104 or the client device 120. In addition to the processing circuit, the data processing system 110 may include one or more databases configured to store data. The data processing system 110 may also include an interface configured to receive data via the network 101 and to provide data from the data processing system 110 to any of the other devices on the network 101. The data processing system 110 can include a server, such as an ad server or otherwise.

The client device 120 can generate requests for third-party content, and transmit such requests to the data processing system 110. The client device 120 can receive third-party content items from the data processing system 110, responsive to such requests. The client device 120 can include one or more devices such as a computer, laptop, desktop, smart phone, tablet, personal digital assistant, set-top box for a television set, a smart television, or server device configured to communicate with other devices via the network 101. The device may be any form of portable electronic device that includes a data processor and a memory. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 120 can execute a software application (e.g., a web browser or other application) to retrieve content from other computing devices over the network 101. Such an application may be configured to retrieve first-party content from a resource server 104. An application running on the client device 120 may itself be first-party content (e.g., a game, a media player, etc.). The client device 120 can execute a web browser application that provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 120 executing the instructions from the web browser application may request data from another device connected to the network 101 referred to by the URL address (e.g., a resource server 104). The other device may then provide web page data, geographic map data, or other data to the client device 120, which causes visual indicia to be displayed by the display of the client device 120. Accordingly, the browser window displays the retrieved first-party content, such as web pages from various websites, to facilitate user interaction with the first-party content.

The resource server 104 can include a computing device, such as a server, configured to host a resource, such as a web page or other resource (e.g., articles, comment threads, music, video, graphics, search results, information feeds, geographic map data, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. The client device 120 can access the resource server 104 via the network 101 to request data to effect presentation of a resource of the resource server 104.

One or more third-party content providers may have third-party content servers 102 to directly or indirectly provide data for third-party content items to the data processing system 110 or to other computing devices via network 101. The third-party content servers 102 or other computing devices associated a third-party content provider can provide content selection parameters to the data processing system 110 to be used in selecting content items of that third-party content provider for presenting on client devices 120. The content items may be in any format that may be presented on a display of a client device 120, for example, graphical, text, image, audio, video, etc. The content items may also be a combination (hybrid) of the formats. The content items may be banner content items, interstitial content items, pop-up content items, rich media content items, hybrid content items, Flash content items, cross-domain iframe content items, etc. The content items may also include embedded information such as hyperlinks, metadata, links, machine-executable instructions, annotations, etc. In some instances, the third-party content servers 102 may be integrated into the data processing system 110 or the data for the third-party content items may be stored in a database of the data processing system 110. The content selection parameters can include indication of one or more themes, keywords, budget values, indications of local geographical areas of interest, dates or time intervals of interest, types of client devices of interest, types of first-party resources (e.g., websites, web applications, electronic maps, or standalone applications) of interest, bid values, or a combination thereof.

The data processing system 110 can receive, via the network 101, a request for a content item to present with a resource. The request may be received from a resource server 104, a client device 120, or any other computing device. The resource server 104 may be owned or ran by a first-party content provider that may include instructions for the data processing system 110 to provide third-party content items with one or more resources of the first-party content provider on the resource server 104. The resource can include a web page, or geographic map data. The client device 120 can be a computing device operated by a user (represented by an anonymous device identifier), which, when accessing a resource of the resource server 104, can make a request to the data processing system 110 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the data processing system 110 receives can include a HyperText Transfer Protocol (HTTP) cookie or other data block that contains a device identifier (e.g., a random or pseudo random number) that represents the client device 120. The device information or the resource information may be appended to a content item request URL (e.g., contentitem.item/page/contentitem?devid=abc123&devnfo=A34r0). The device information or the resource information may be encoded prior to being appended the content item request URL. The requesting device information or the resource information may be utilized by the data processing system 110 to select third-party content items to be served with the requested resource and presented on a display of a client device 120. Responsive to the content item request, the data processing system 110 can retrieve and process content selection parameters associated with a given third-party content provider to determine whether or not to provide a content item of that third-party content provider for presentation on the client device 120.

A resource of a resource server 104 can include a search engine feature. The search engine feature can receive a search query (e.g., a string of text) via an input feature (an input text box, etc.). The search engine can search an index of documents (e.g., other resources, such as web pages, etc.) for relevant search results based on the search query. The search results can be transmitted as a second resource to present the relevant search results, such as a search result web page, on a display of a client device 120. The search results can include, for example, web page titles, or hyperlinks. One or more third-party content items can be presented with the search results in a content item slot of the search result web page. Accordingly, the resource server 104 or the client device 120 can request one or more content items from the data processing system 110 to be presented in the content item slot of the search result web page. The content item request can include additional information, such as the user device information, the resource information, a quantity of content items, a format for the content items, the search query string, keywords of the search query string, information related to the query (e.g., geographic location information or temporal information). The resource server(s) 104 (or the data processing system 110) can make a delineation between the search results and the third-party content items to avert confusion. For example, the resource server(s) 104 (or the data processing system 110) can specify the display areas for both the search results and the third-party content items on web browser.

The third-party content server(s) 102 can manage the selection and serving of content items by the data processing system 110. For instance, the third-party content server(s) 102 can provide the content selection parameters to the data processing system 110 to be used to select content items of the respective third-party content provider. For example, the third-party content server(s) 102 may set content selection parameters via a user interface that may define one or more content item conditions or constraints regarding the serving of content items. A third-party content server 102 can specify that a content item or a set of content items are to be selected and served for user devices 120 having device identifiers associated with a certain geographic location or region, a certain language, a certain operating system, or a certain web browser for example. The third-party content provider can specify that a content item or set of content items are to be selected and served when the resource, such as a web page, document, etc., contains content that matches or is related to certain keywords, phrases, etc. The third-party content server 102 can set a single bid value per content item or per subset of content items. The third-party content provider may also set the types of such values, such as based on whether a user clicks on the third-party content item, whether a user performs a specific action based on the presentation of the third-party content item, whether the third-party content item is selected and served, or the like.

The various concepts introduced above and discussed in greater detail below may be implemented in any of numerous ways as the described concepts are not limited to any particular manner of implementation. Examples of specific implementations and applications are provided primarily for illustrative purposes.

Figure 2:
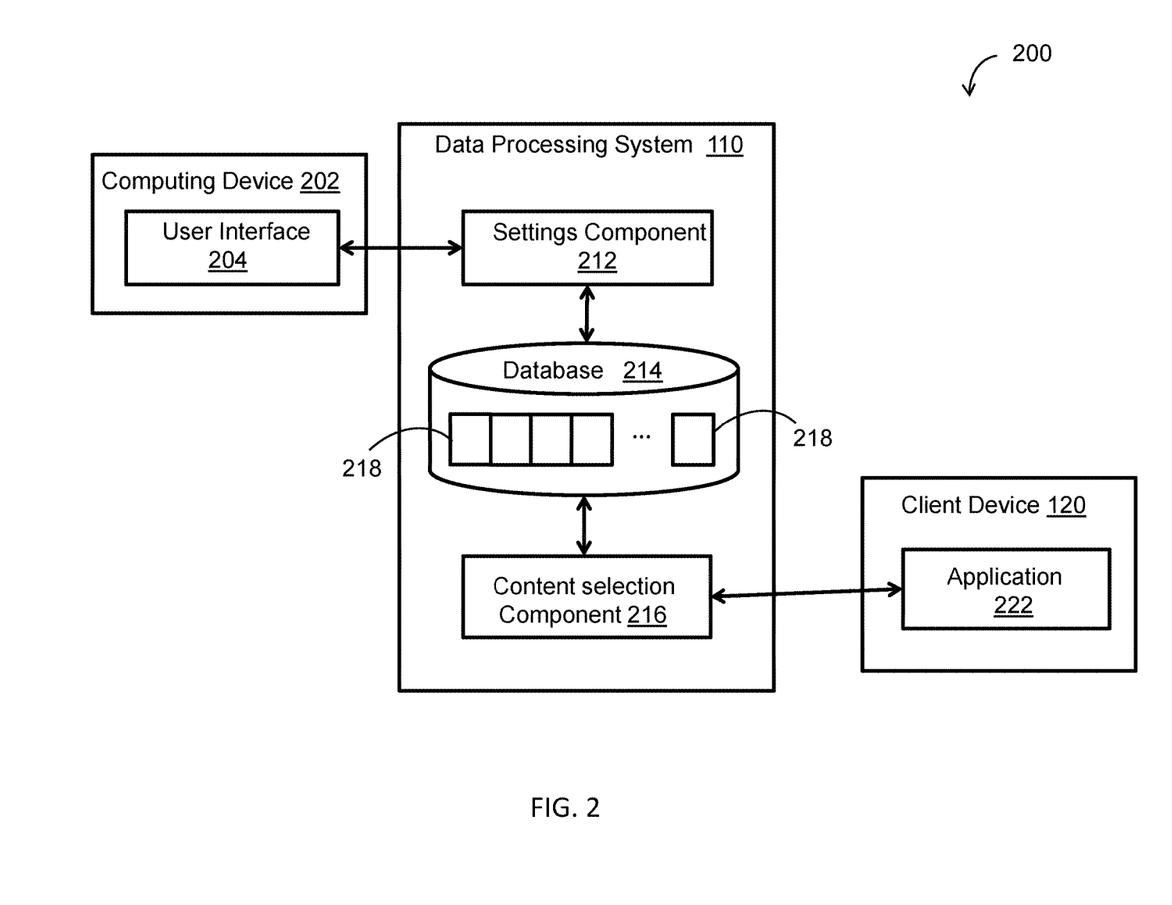
FIG. 2 shows a diagram illustrating an example computer environment for arranging and storing content selection parameters of third-party content providers, used to select third-party content, based on content selection policies.

FIG. 2 shows a diagram illustrating a computer environment 200 for arranging and storing content selection parameters of third-party content providers, used to select third-party content, based on content selection policies. The computer environment 200 can include a data processing system 110, a client device 120, and a computing device 202 associated with a third-party content provider. The data processing system 110, the client device 120, and the computing device 202 can be communicatively coupled via the communications network 101 (e.g., shown in FIG. 1). The data processing system 110 can include a settings component 212, a database 214, and a content selection component 116. The database 214 can include, or can be stored in, a memory including a plurality of data banks 218. The settings component 212 and the content selection component 116 can be implemented as (or on) separate computing devices (e.g., computer servers) of the data processing system 110. In some instances, software (or hardware) modules associated with various the settings component 212, the content selection component 216, or the database 216 can be implemented on a single computing device. The client device 120 can include an application 222, such as a web browser, a map application, an email application, a video player application, or a mobile application for displaying online content. While FIG. 2 shows a single client device 120, in general, the computer environment 200 can include a plurality of client devices 120 communicatively coupled to the data processing system 110, for example, via the communications network 101 (e.g., shown in FIG. 1). The computing device 202 associated with the third-party content provider can include (or provide) a user interface (UI) 203 associated with the data processing system 110.

The data processing system 110 can include a settings component 212 to receive and manage content selection parameters (or ad campaigns) for providing third-party content associated with various third-party content providers. The settings component 212 can be a separate computing device (such as a hardware computer server) or a software module executable by on one or more computing devices. In general, the settings component 212 can include a software module, a hardware module, or a combination of software and hardware modules. The data processing system 110 can include a plurality of instances of the settings component 212. The settings component 212 can provide a plurality of computing devices 202 associated with multiple third-party content providers with the user interface 204. The settings component 212 can provide the user interface 204 as part of a client application or as a web interface for accessing the settings component 212 or data associated thereof. A user of a computing device 202 can provide content selection parameters for managing distribution of third-party content associated with a third-party content provider to client devices 120.

The content selection parameters set by the computing device 202 for a given third-party content provider can include one or more themes (e.g., associated with a group or category of products or services, a company, or a database of third-party content items), one or more budgets, a plurality of keywords, bidding values, indications of one or more geographical locations, indication(s) of one or more types of client devices 120, indication(s) of one or more dates or time intervals, or a combination thereof. The content selection parameters provided by the computing device 202 can include two or more content selection parameters associated with distinct content selection policies, but with a common parameter category. The settings component 212 can group (or allow grouping) content selection parameters of a given category associated with separate content selection policies into a single set of content selection parameters.

For example, the set of content selection parameters defined or constructed by the settings component 212, can include a first allocation value, a plurality of second allocation values, a plurality of third allocation values, or a combination thereof. The computing device 212 can set the first allocation value for providing content items of the third-party content provider for display on client devices 120 located within a nationwide (or statewide) geographical area (e.g., throughout a whole country or a whole state). The computing device 212 can set each of the plurality of second allocation values for providing content items of the third-party content provider for display on client devices located within a respective local geographical area. The computing device 212 can set each of the plurality of third allocation values for providing content items of the third-party content provider for display on client devices having a respective type (e.g., mobile devices or desktops), or a combination thereof. Accordingly, the first allocation value can be independent of each of the plurality of second allocation values in the sense that it is associated with a content selection policy that is different than those associated with the plurality of the second allocation values and the plurality of third allocation values. Similarly, each third allocation value can be separate from and independent of the first allocation value and the plurality of second allocation values. Also, a change (e.g., a decrease) in the first allocation value does not affect any of the second allocation values or any of the third allocation values. Similarly, a change in any of the second allocation values does not affect the first allocation value or any of the third allocation values, and a change in any of the third allocation values does not affect the first allocation value or any of the second allocation values.

The content selection parameters provided by the computing device 212 may include a first theme, for example, indicative of a first category of products or services (or associated with a first set or database of third-party content items), and a second theme independent of the first theme, for example, indicative of a second category of products or services (or associated with a second set or database of third-party content items). The first theme or the second theme may include a plurality of sub-themes. Instead of constructing two separate sets of content selection parameters, each associated with a separate theme, the settings component can construct a single set of content selection parameters including both the first and second themes. Constructing two separate sets of content selection parameters associated with the first and second themes can result in parameter storage redundancy because such sets would have many identical content selection parameters in common.

The settings component 212 can receive the content selection parameters from the user interface 204 (or the computing device 202), for example, via the network 101. The settings component 212 can receive the content selection parameters from the computing device 202 all at once or in pieces of data over time. For example, the settings component 212 can first receive one or more first content selection parameters associated with a first content selection policy at a first time instant, and receive one or more second content selection parameters associated with a second content selection policy at a later time instant. The settings component 212 can also receive one or more third content selection parameters associated with a third content selection policy at a third time instant. The settings component 212 can manage storage or access of the content selection parameters associated with a third-party content provider in a way to reduce (or optimize) usage of memory and computing resources. The settings component 212 can group content selection parameters associated with distinct content selection policies in a single set of content selection parameters (e.g., a single ad campaign) to avoid storage redundancy of any of the content selection parameters. The settings component 212 can also store content selection parameters of the same category but associated with distinct content selection policies together in a single memory bank, for example, to enhance the speed of accessing these content selection parameters when processing requests for third-party content.

By storing and managing the content selection parameters associated with distinct content selection policies as a single set of content selection parameters (e.g., a single ad campaign) allows avoiding storage of some parameters redundantly in multiple sets of content selection parameters for the same third-party content provider. Also, grouping separate and independent (e.g., associated with distinct content selection policies) content selection parameters of a single category in a single set of content selection parameters allows for avoiding redundant retrieval or repeated processing of some content selection parameters when handling requests for third-party content.

The settings component 212 can store the received content selection parameters in the database 204. The database 204 can be associated with (or hosted in) a storage device (e.g., a hard disc) of the data processing system 110 or a random access memory (RAM) associated with a computing device hosting the settings component 212. The database 204 can include or can be associated with a plurality of memory banks 218. The settings component 212 or the content selection component 216 can access data stored in a single memory bank 218 in a single read or a single write operation. The settings component 212 can store separate content selection parameters associated with a common category but different content selection policies (e.g., independent and separate budgets or independent and separate themes as discussed above) in a single databank 218. Storing such content selection parameters (e.g. having the same category but associated with different content selection policies) in a single memory bank allows the settings components 212 or the content selection component 216 to access these parameters in a single read or a single write operation from that memory bank 218, and therefore speed up retrieval of these parameters. In some instances, the settings component 212 can store the content selection parameters associated with distinct content selection policies in two or more memory banks 218.

Figure 3:
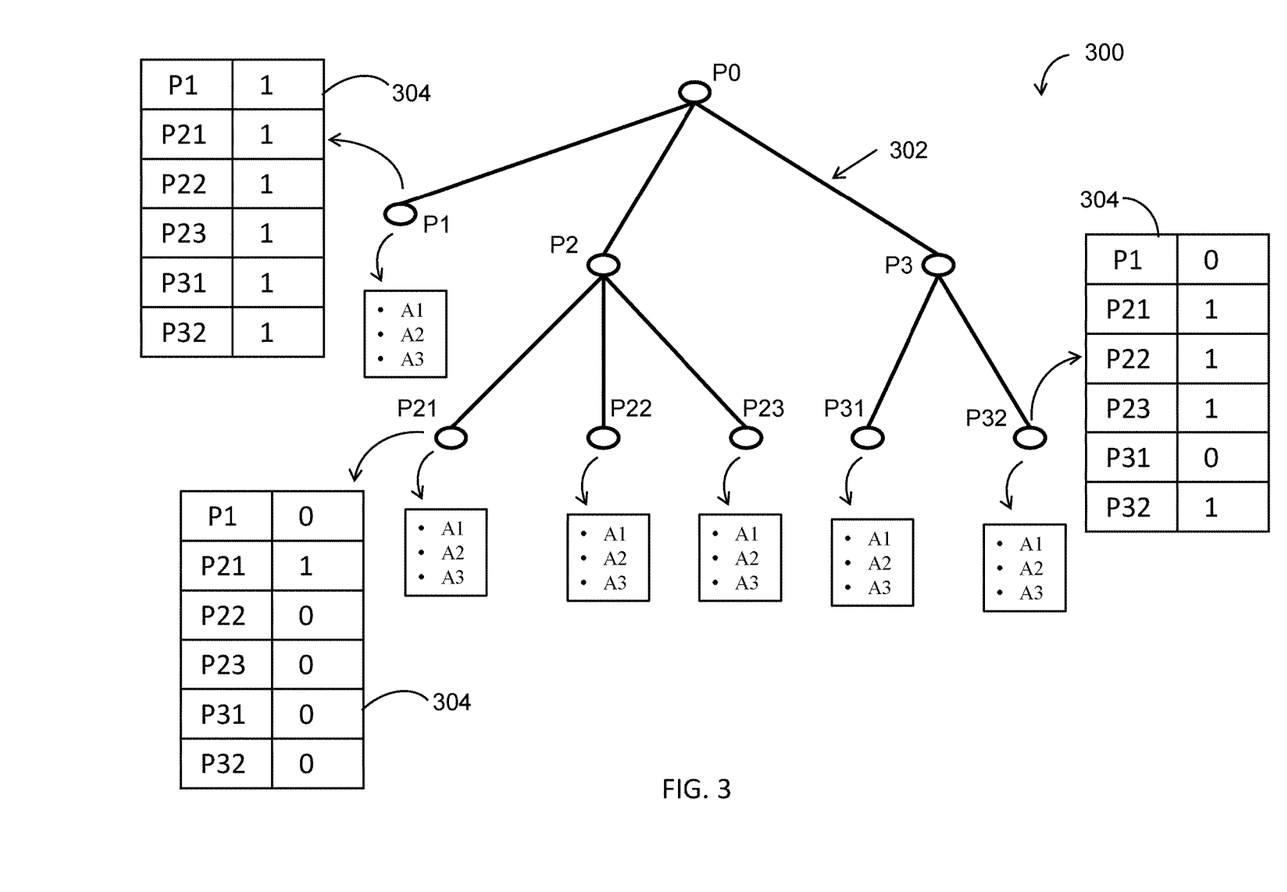
FIG. 3 shows a data structure 300 for storing content selection parameters, used to select third-party content for display on client devices, that are associated with a single parameter category but associated with different content selection policies, according to one or more embodiments.

FIG. 3 shows a data structure 300 for storing content selection parameters, used to select third-party content for display on client devices, that are associated with a single parameter category but associated with different content selection policies, according to one or more embodiments. The data structure 300 can include a nested data structure (e.g., a combination of data structures with one data structure or elements thereof pointing to another data structure). The data structure 300 can include a first data structure 302, such as a tree with respective nodes representing content selection parameters of the same category. For example, P1 can be indicative of a allocation value for serving third-party content to all client devices 120, for example, regardless of their types or geographical locations. Nodes P21, P22, and P23 can be indicative of allocation values for serving third-party content to client devices located in, respectively, a first, second, and third local geographical areas (e.g., areas associated with stores of the third-party content provider). The nationwide geographical location associated with node P1 can be overlapping with the local geographical locations associated with nodes P21, P22, and P23. Nodes P31 and P32 can be indicative of allocation values for serving third-party content to client devices of a first type (e.g., mobile devices) and a second type (e.g., non-mobile devices such as desktops), respectively. Node P2 can be indicative of a sum of values (or a broader theme of parameters) associated with nodes P21, P22 and P23. Also, node P3 can be indicative of a sum of values (or a broader theme of parameters) associated with nodes P31 and P32. Node P0 can be indicative of the category (e.g., budget or theme) of the settings parameters represented by the tree.

Each of the leaf nodes P1, P21, P22, P23, P31 and P32 (e.g., each associated with a respective content selection parameter) can include or specify one or more additional attributes (e.g., attributes A1, A2, and A3). For example, each node representing an allocation value can be associated with one or more attributes (e.g., bid values, one or more time or date values, or other attributes indicative of how or when to use the corresponding allocation value to select a content item for presentation on the client device 120. For instance, node P21 can be indicative of a allocation value for presenting third-party content to client devices in a local geolocation (or local geographical area), and can specify a bid value (or a range thereof) used to present third-party content items on client devices in that geolocation (based on the allocation value associated with node P21). Node P21 can also specify time frames (e.g., time intervals during the day) during which third-party content items can be presented on client devices in that geolocation (based on the allocation value associated with node P21).

In order to address which content selection parameter (and respective attribute(s)) to be used in the case of overlap between two or more content selection parameter (e.g., associated with two or more nodes or entries in the database 302), each of the leaf nodes P1, P21, P22, P23, P31 and P32 can include (or can be pointing to) a respective second data structure 304 (e.g., a table, array, linked list or other tree) to indicate relative priorities of the corresponding content selection parameter (e.g., with respect to other content selection parameters associated with other nodes or entries of the data structure 302). For example, the table 304 associated with the node P1 can represent the priority of using the content selection parameter or attributes corresponding to P1 versus using a content selection parameter and attributes corresponding to another node in the case of an overlap. An overlap can occur when content selection parameters or attributes corresponding to more than two nodes can be used based on one or more criteria. For instance, if P1 represents an allocation value for providing content items to client devices in a nationwide geolocation (or nationwide geographical area) and P21 represents an allocation value for providing content items to client devices in a local geolocation or geographical area (e.g., a specific state, county, town, or neighborhood), content selection parameters or attributes corresponding to both nodes P1 and P21 can be used when serving a client device at the local geolocation (given the overlap between the nationwide geolocation associated with P1 and the local geolocation associated with node P21).

In the case of an overlap, priority values in the data structures 304 associated with either nodes can indicate which content selection parameter or attributes the content selection component 216 can use. In the data structures 304, the value 1 in a given row can indicate, for example, a higher priority, with respect to another node associated with that row, than the value zero. For example, the content selection parameter or attribute(s) associated node P1 have higher priorities over content selection parameters or attributes of other nodes. Also node P32 has higher priorities over nodes P21, P22, and P23. The data structures 304 can include other values or priority rules (e.g., instead of a table of zeros and ones). As described above, the nested data structure 300 can include content selection parameters and respective relative priorities or priority rules associated with a given third-party content provider. The nested data structure 300 can include information, associated with a respective third-party content provider, that is sufficient for the content selection component 216 to decide to present a content item of that third-party content provider to a requesting client device 120.

Referring to FIG. 2, among others, the settings component 212 can store or organize content selection parameters (or ad campaign data) received from the computing device 202 or a portion thereof according to the nested data structure 300. The settings component 212 can store each nested data structure 300 in a single memory bank 218. The nested data structure 300 can include any combination of data structures. For example, the data structure 302 can be a table, an array, or a linked list.

The content selection component 216 can receive a request for third-party content from the client device 120 or the application 222 running thereon. The application 222 can include a web browser, an email application, a gaming application, a navigation application, or a mobile application. Upon launching the application 222 or initiating, on the client device 120, display of a resource (e.g., a web page, a map, or other online content), the application 222 or a script associated with application 222 can send a request for third party content to the data processing system 110. The request can include context information related to the client device 120 (e.g., indication(s) of a device type, device ID, device location, display resolution, screen type such as touch screen, application ID, application type, indication(s) of online navigation history, indication(s) of user preferences, or a combination thereof), context information related to the resource (e.g., a URL or one or more keywords associated with the resource), or a combination thereof.

Upon receiving the request for third-party content from the client device 120, the content selection component 216 can compare keywords associated with the request to keywords associated with various third-party content-providers. If a match between one or more keywords for a given third-party content provider and one or more keywords associated with the request is found, the content selection component 216 can retrieve the set of content selection parameters (or a subset thereof) from a respective memory bank 218. For instance, the content selection component 216 can retrieve a data structure 300 associated with the third-party content provider from a respective memory bank. The content selection component 216 can retrieve the data structure 300 by performing a single read operation.

The content selection component 216 can process or scan the retrieved content selection parameters (or the data structure 300) to determine whether to provide a content item of the third-party content provider based on any of the content selection parameters of the third-party content provider (e.g., any of the content selection parameters associated with nodes P1, P21, P22, P23, P31 or P32). For instance, the content selection component 216 can check the content selection parameter (e.g., allocation value for nationwide geographical area) associated with node P1, any additional attributes associated with node P1, and priority values (e.g., in respective data structure 304). Upon checking the priority values associated with node P1, the content selection component 216 can determine that the settings parameter associated with node P1 (e.g., allocation value for nationwide or other geographical area) has higher priority over settings parameters associated with all other nodes. Accordingly, the content selection component 216 can select a content item of the third-party content provider, for presenting on the client device 120, based on information associated with node P1 without checking the other nodes. The content selection component 216 can provide the selected content item for presentation on the client device 120, responsive to the request for third-party content.

The content selection component 216 can adjust one or more parameters or attributes associated with node P1, responsive to serving the content selected item to the client device 120. For example, the content selection component 216 can adjust the content selection parameter (e.g., allocation values) or a count of content items associated with node P1. The content selection component 216 can provide the adjusted content selection parameter, the adjusted count of content items, an indication of content items provided for display based on the first content selection parameter, or indications of content items provided for display based on each of the second content selection parameters to a third-party content server 102 associated with the third-party content provider.

If the content selection component 216 checked node P21 first (e.g., the client device 120 located at a first local geographical area associated with node P21), it can determine that the content selection parameter associated with node P21 (e.g., an allocation value for providing content items to client devices in the first local geographical area) is associated with a priority lower than content selection parameters associated with other nodes of the data structure 302. In such case, the content selection component 216 can move to another node associated with a geographical location that overlaps with the location of the client device 120, such as node P1. The content selection component 216 can then determine that node P1 has higher priorities than all other nodes, and provide a content item based on the content selection parameter associated with node P1 as described above.

While maintaining or storing a priority data structure 304 for each of the nodes P1, P21, P22, P23, P31, and P32 involves storage redundancy (e.g., storing each priority value associated with a respective pair of nodes twice), the use of data structures 304 can speed up the handling of requests for third-party content from client devices. For example, as discussed above, once the content selection component 216 reaches a node with higher priorities compared to other relevant nodes (e.g., nodes associated with geolocations overlapping with the location of client device 120, or associated with a device type similar to that of client device 120), the content selection component 216 can stop checking other nodes of the data structure 302 and serve a content item based on the content selection parameter of the reached node.

The priority values associated with the data structures 304 can be dynamic. The settings component 212 can update the priority values based on, for example, new information received from the computing device 302, or responsive to change(s) in value(s) of one or more content selection parameters associated with one or more nodes of data structure 302.

Figure 4:
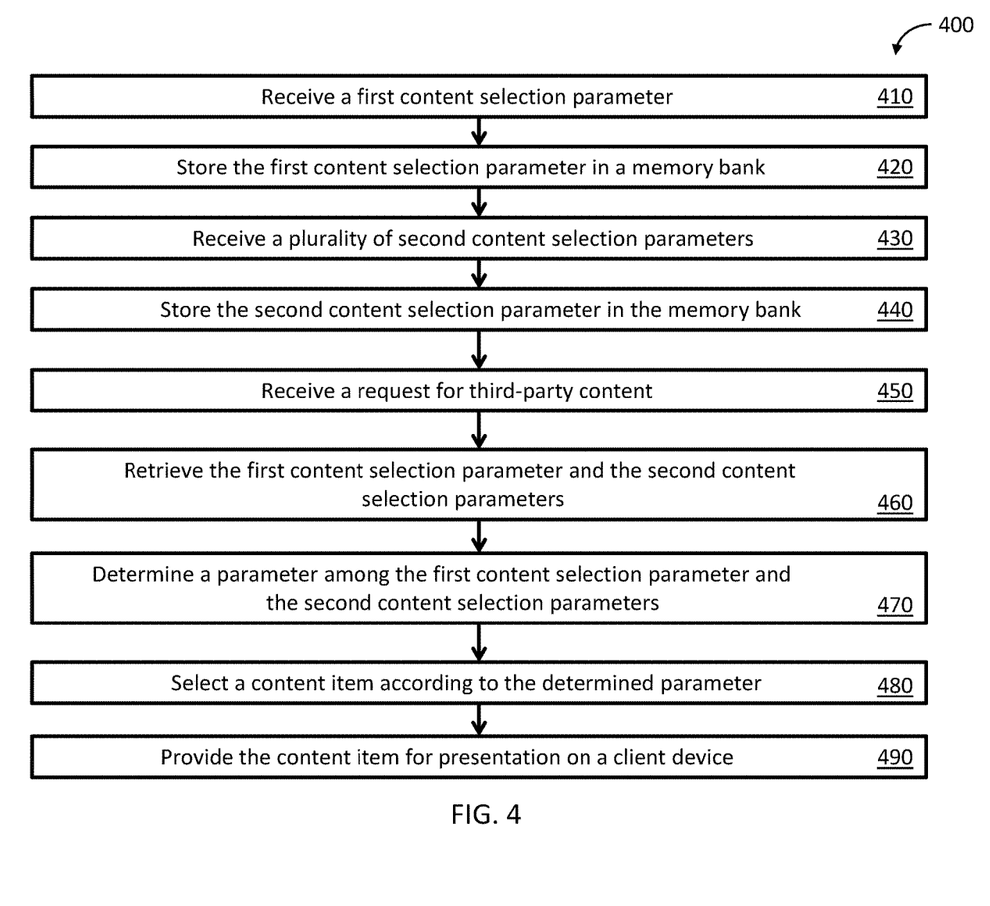
FIG. 4 shows a flowchart illustrating a method 400 of arranging and storing content selection parameters used to select third-party content based on content selection policies, according to one or more embodiments.

FIG. 4 shows a flowchart illustrating a method 400 of arranging and storing content selection parameters used to select third-party content based on content selection policies, according to one or more embodiments. The method 400 can include a data processing system receiving, from a computing device of a third-party content provider, a first content selection parameter of a third-party content provider (ACT 410) and storing the content selection parameter in a memory bank (ACT 420). The method 400 can include the data processing system receiving, from the computing device of the third-party content provider, a plurality of second content selection parameters of the third-party content provider (ACT 430), and storing the plurality of second content selection parameters in the memory bank together with the first content selection parameter (ACT 440). The method 400 can include the data processing system receiving a request for third-party content (ACT 450). The method 400 can include the data processing system retrieving the first content selection parameter and the plurality of second content selection parameters from the memory bank (ACT 460), and determining (or selecting) a parameter among the first content selection parameter and the plurality of second content selection parameters (ACT 470). The method 400 can include the data processing selecting a content item of the third-party content provider based on the determined parameter (ACT 480), and providing the selected content item for presentation on the client device 120 (ACT 490).

Referring to FIGS. 1-4, the method 400 can include the data processing system 110 (or the settings component 312) receiving the first content selection parameter from the computing device 202 (ACT 410), storing the first content selection parameter in a memory bank (ACT 420), receiving a plurality of second content selection parameters from the computing device 202 (ACT 430), and storing the plurality of second content selection parameters in the memory bank (ACT 440). The plurality of second content selection parameters can be independent of the first content selection parameter in the sense that each second content selection parameter can be associated with a different content selection policy than a content selection policy associated with the first content selection component. For example, the first content selection parameter can be indicative of a first allocation value for serving content items to client devices located within a nationwide area, and each of the second content selection parameters can be an allocation value for serving content items of the third-party content provider to client devices located in a respective local geographical area. The nationwide geographical area can overlap with the local geographical areas.

The data processing system 110 may store the first content selection parameter and the plurality of second content selection parameters in a single data structure, such as data structure 300. The data structure 300 can include additional attributes or relative priority values associated with each settings parameter. The data processing system 110 can store the data structure 300 in a single memory bank 218. In some implementations, the data processing system 110 can, for example, first receive the first content selection parameter and store it in the memory bank 218 (e.g., as part of data structure 300). The data processing system 110 can then receive the plurality of second content selection parameters and store them in the same data bank 218. The data processing system 110, for example, can append the data structure 300 with the plurality of second content selection parameters. In some implementations, the data processing system 110 can receive the first content selection parameter and the plurality of second content selection parameters together and store them together in a single memory bank 218.

The method 400 can include the data processing system 110 receiving a request for third-party content (ACT 450). The data processing system 100 can receive the request from a client device 120. The request can include context information related to the client device 120 (e.g., indication(s) of a device type, device ID, device location, display resolution, screen type such as touch screen, application ID, application type, indication(s) of online navigation history, indication(s) of user preferences, or a combination thereof), context information related to the resource (e.g., a URL or one or more keywords associated with the resource), or a combination thereof.

The method 400 can include the data processing system 110 retrieving the first content selection parameter and the plurality of second content selection parameters from the memory bank (ACT 460), and determining a parameter among the first content selection parameter and the plurality of second content selection parameters (ACT 470). For instance, the data processing system 110 can retrieve the data structure 300 from the memory bank 218 and determine a content selection parameter among the content selection parameters associated with data structure 300 based on, for example, corresponding relative priority values as described with regard to FIG. 3 above.

The method 400 can include the data processing system 110 selecting a content item based on the determined parameter (ACT 480), and providing the selected content item for display on the client device 120 (ACT 490). The data processing system 110 can select the content item based on, for example, one or more attributes associated with the determined parameter as discussed with regard to FIG. 3.

The data processing system 110 can update the first content selection parameter upon selecting and serving the content item based on the first content selection parameter, or can update one of the second content selection parameter upon selecting and serving the content item based on that second content selection parameter. The data processing 110 can send indication of content items served based on the first content selection parameter, indications of content items served based on each of the plurality of second content selection parameter, or a combination thereof to computing device 202 or third-party content server 102. As described with regard to FIG. 3, the data processing system 110 can receive a plurality of third content selection parameters (e.g., content selection parameters associated with nodes P31 and P32), and store the plurality of third content selection parameters in the memory bank 218 (e.g., as part of data structure 300). The data processing system 110 can select and serve content items based on the first content selection parameter, the plurality of second content selection parameters, and the plurality of third content selection parameters.

Figure 5:
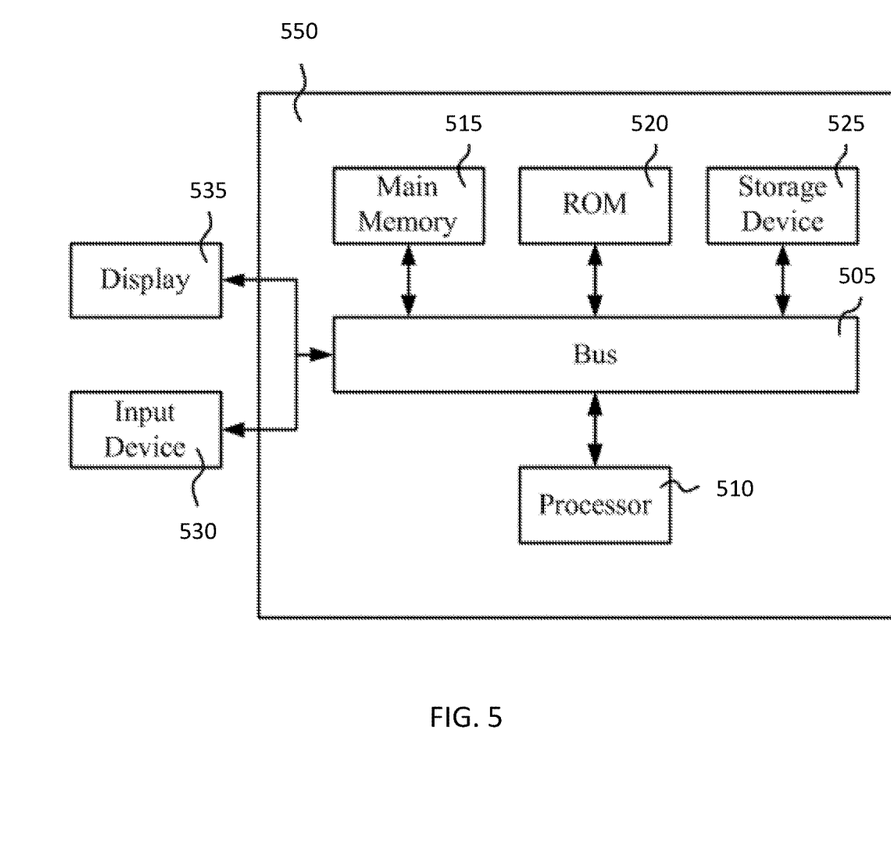
FIG. 5 is a block diagram depicting one implementation of a general architecture for a computer system that may be employed to implement various elements of the systems and methods described and illustrated herein.

FIG. 5 is a block diagram of a computer system 500 that can be used to implement the client device 120, data processing system 110, third-party content server 102, resource server 104, computing device 202, settings component 212, or content selection component 216. The computing system 500 includes a bus 505 or other communication component for communicating information and a processor 510 coupled to the bus 505 for processing information. The computing system 500 can also include one or more processors 510 coupled to the bus for processing information. The computing system 500 also includes main memory 515, such as a RAM or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a ROM 520 or other static storage device coupled to the bus 505 for storing static information and instructions for the processor 510. A storage device 525, such as a solid state device, magnetic disk or optical disk, is coupled to the bus 505 for persistently storing information and instructions. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 500 may be coupled via the bus 505 to a display 535, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 530, such as a keyboard including alphanumeric and other keys, may be coupled to the bus 505 for communicating information and command selections to the processor 510. In another implementation, the input device 530 may be integrated with the display 535, such as in a touch screen display. The input device 530 can include a cursor control, such as a mouse, a trackball, or cursor direction keys, for communicating direction information and command selections to the processor 510 and for controlling cursor movement on the display 535.

According to various implementations, the processes or methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes or method ACTs described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an implementation of a computing system 500 has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Where technical features in the drawings, detailed description or any claim are followed by reference identifiers, the reference identifiers have been included to increase the intelligibility of the drawings, detailed description, and claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A system to arrange and store content selection parameters, to distribute third-party content to computing devices via a computer network, based on content selection policies, comprising:
   a data processing system having one or more processors, a memory and a settings component that:
      receives, from a computing device associated with a third-party content provider, a first content selection parameter indicative of an allocated budget for providing content items of the third-party content provider for display on client devices located within a nationwide geographical area;
      receives, from the computing device, a plurality of second content selection parameters, each of the plurality of second content selection parameters associated with a different content selection policy than the first content selection parameter, and each of the plurality of second content selection parameters indicative of a respective allocated budget for providing content items of the third-party content provider for display on client devices located within a respective local geographical area; and
      provides the first content selection parameter and the plurality of second content selection parameters for storage in a nested data structure stored in the memory, the nested data structure including, for each of the first content selection parameter and the plurality of second content selection parameters, a respective plurality of priority values associated with the first content selection parameter and the plurality of second content selection parameters; and
   the data processing system having a content component that:
      receives, via a computer network, a request for third-party content for presentation on a client device;
      determines a parameter among the first content selection parameter and the plurality of second content selection parameters based on one or more pluralities of priority values in the nested data structure;
      selects, based on the determined parameter, a content item from a plurality of content items of the third-party content provider;
      provides, via the computer network, the selected content item for presentation on the client device; and
      update the determined parameter in the nested data structure responsive to selecting the content item based on the determined parameter.

2. The system of claim 1, comprising:
   the settings component configured to perform at least one of:
      provide indications of content items of the third-party content provider selected based on the first content selection parameter and provided for display on client devices; and
      provide indications of content items of the third-party content provider selected based on one of the plurality of second content selection parameters and provided for display on client devices.

3. The system of claim 1, wherein each of the local geographical areas overlaps with the nationwide geographical area.

4. The system of claim 1 comprising the settings component configured to:
   receive, from the computing device, a plurality of third content selection parameters each of the plurality of content selection parameter associated with a content policy selection different than content selection policies associated with the first content selection parameter and the plurality of second content selection parameters; and
   provide the plurality of third content selection parameters for storage in the memory, and
   the content component configured to:
   retrieve the first content selection parameter, the plurality of second content selection parameters, and the plurality of third content selection parameters from the memory, responsive to the request for third-party content; and determine a parameter among the first content selection parameter, the plurality of second content selection parameters, and the plurality of third content selection parameters.

5. The system of claim 1, wherein the request for third-party content includes an indication of a location of the client device.

6. The system of claim 5 comprising the content component determine a parameter among the first content selection parameter and the plurality of second content selection parameters by selecting one of the first content selection parameter and the plurality of second content selection parameters based on the location of the client device, the nationwide geographical area associated with the first content selection parameter and the local geographical areas associated with the plurality of second content selection parameters.

7. A method of arranging and storing content selection parameters, for use to provide third-party content, based on content selection policies, comprising:
   receiving, by a data processing system, from a computing device associated with a third-party content provider, a first content selection parameter indicative of an allocated budget for providing content items of the third-party content provider for display on client devices located within a nationwide geographical area;
   receiving, by the data processing system, from the computing device, a plurality of second content selection parameters, each of the plurality of second content selection parameters associated with a respective content selection policy different than a content selection policy associated with the first attribute value, and each of the plurality of second content selection parameters indicative of a respective allocated budget for providing content items of the third-party content provider for display on client devices located within a respective local geographical area;
   providing, by the data processing system, the first content selection parameter and the plurality of second content selection parameters for storage in a nested data structure stored in the memory, the nested data structure including, for each of the first content selection parameter and the plurality of second content selection parameters, a respective plurality of priority values associated with the first content selection parameter and the plurality of second content selection parameters;
   receiving, by the data processing system, via a computer network, a request for third-party content for presentation on a client device;
   determining, by the data processing system, a parameter among the first content selection parameter and the plurality of second content selection parameters based on one or more pluralities of priority values in the nested data structure;
   selecting, by the data processing system, based on the determined parameter, a content item from a plurality of content items of the third-party content provider;
   providing, by the data processing system, via the computer network the selected content item for presentation on the client device; and
   updating, by the data processing system, the determined parameter in the nested data structure responsive to selecting the content item based on the determined parameter.

8. The method of claim 7, comprising at least one of:
   providing, by the data processing system, indications of content items of the third-party content provider selected based on the first content selection parameter and provided for display on client devices; and
   providing, by the data processing system, indications of content items of the third-party content provider selected based on one of the plurality of second content selection parameters and provided for display on client devices.

9. The method of claim 7, wherein each of the local geographical areas overlaps with the nationwide geographical area.

10. The method of claim 7 comprising:
    receiving, from the computing device, a plurality of third content selection parameters each of the plurality of third content selection parameters associated with a respective content selection policy different than content selection policies associated with the first content selection parameter and the plurality of second content selection parameter;
    provide the plurality of third content selection parameters for storage in the memory;
    retrieve the first content selection parameter, the plurality of second content selection parameters, and the plurality of third content selection parameters from the memory, responsive to the request for third-party content; and
    determine a parameter among the first content selection parameter, the plurality of second content selection parameters, and the plurality of third content selection parameters.

11. The method of claim 7, wherein the request for third-party content includes an indication of a location of the client device.

12. The method of claim 11 comprising:
    determining a parameter among the first content selection parameter and the plurality of second content selection parameters by selecting one of the first content selection parameter and the plurality of second content selection parameter based on the location of the client device, the nationwide geographical area with the first attribute value and the local geographical areas associated with the plurality of second content selection parameters.

13. A non-transitory computer-readable medium comprising computer code instructions stored thereon, the computer code instructions, when executed by one or more processors, cause a data processing system to:
    receive, from a computing device associated with a third-party content provider, a first content selection parameter indicative of an allocated budget for providing content items of the third-party content provider for display on client devices located within a nationwide geographical area;
    receive, from the computing device, a plurality of second content selection parameters, each of the plurality of second content selection parameters associated with a respective content selection policy different than a content selection policy associated with the first content selection parameter, and each of the plurality of second content selection parameters indicative of a respective allocated budget for providing content items of the third-party content provider for display on client devices located within a respective local geographical area;
    provide the first content selection parameter and the plurality of second content selection parameters for storage in a nested data structure stored in the memory, the nested data structure including, for each of the first content selection parameter and the plurality of second content selection parameters, a respective plurality of priority values associated with the first content selection parameter and the plurality of second content selection parameters;

receive, via a computer network, a request for third-party content for presentation on a client device;

determine a parameter among the first content selection parameter and the plurality of second content selection parameters based on one or more pluralities of priority values in the nested data structure;

select, based on the determined parameter, a content item from a plurality of content items of the third-party content provider;

provide, via the computer network, the selected content item for presentation on the client device; and update the determined parameter in the nested data structure responsive to selecting the content item based on the determined parameter.

* * * * *